United States Patent [19]
Gleddie et al.

[11] Patent Number: 5,586,411
[45] Date of Patent: Dec. 24, 1996

[54] METHOD OF PREPARING A SEED TREATMENT COMPOSITION

[75] Inventors: Sanford C. Gleddie; Mary E. Leggett, both of Saskatoon; Wendell A. Rice; Perry E. Olsen, both of Beaverlodge, all of Canada

[73] Assignees: Her Majesty the Queen in Right of Canada; Philom Bios Inc., both of Saskatchewan, Canada

[21] Appl. No.: 453,257

[22] Filed: May 30, 1995

Related U.S. Application Data

[62] Division of Ser. No. 174,335, Dec. 29, 1993, Pat. No. 5,484,464.

[51] Int. Cl.$^6$ ............................. A01C 1/06; C12R 1/80; C12R 1/41

[52] U.S. Cl. ............................ 47/57.6; 47/58; 504/117; 504/118; 424/93.4; 424/93.5; 435/252.2; 435/252.4; 435/256.3; 435/878; 435/933; 206/527

[58] Field of Search ..................... 47/57.6, 58; 504/117, 504/118; 424/93.4, 93.5; 435/243, 252.2, 252.4, 256.3, 878, 933; 206/527

[56] References Cited

U.S. PATENT DOCUMENTS

| | | | |
|---|---|---|---|
| 5,026,417 | 6/1991 | Kucey | 71/35 |
| 5,484,464 | 1/1996 | Gleddie et al. | 47/57.6 |

FOREIGN PATENT DOCUMENTS

| | | | |
|---|---|---|---|
| 0227336 | 7/1987 | European Pat. Off. | C12N 1/20 |
| 2080669 | 2/1982 | United Kingdom | C12N 11/08 |

OTHER PUBLICATIONS

Downey et al., "Dual Inoculation of *Pisum Sativum* with Rhizobium . . . " Biol Fertil Soils (1990) 10:194–196.
Date et al., "Preparation of Legume Seed Inoculants"—pp. 243–275, 1977
Catroux et al., "Rhizobia As Soil Inoculants in Agriculture", pp. 1–10.
Adu–Gyamfi et al., "Phosphorus Absorption and Utilization Efficiency of Pigeon Pea . . . " Plant and Soil, 119, 1989, pp. 315–324.
Alagawadi et al., "Associative Effect of Rhizobium and Phosphate–Solubilizing Bacteria . . . " Plant and Soil, 1988, pp. 241–247.
Badr El–Din et al, "Response of Soybean to Dual Inoculation . . . " Z. Pflanzenernaeher. Bodenk, 149, 1986, pp. 130–135.
Beck et al., "Phosphate Nutrition of Rhizobium spp." Applied and Environmental Microbiology, Feb. 1984, pp. 278–282.
Curl et al., "The Rhizosphere", 1986, pp. 141–155.

Day, J. M., "Inoculant Production in the U.K.", pp. 75–85.
Griffith, W. K., "Effects of Phosphorus and Potassium on Nitrogen Fixation" Phosphorus for Agriculture; A Situation Analysis, 1986, pp. 57–62.
Grimes et al., "Influence of *Pseudomonas Putida* on Nodulation . . . ", Soil Boil. Biochem., vol. 16, No. 1, 1984, pp. 27–30.
Holland et al., "Studies on Microbil Antagomism in the Establishment of Clover Pasture" Plant and Soil XXV, No. 3, 1966, pp. 329–340.
Sparrow et al., "Survival of *Rhizobium Phaseoli* in Six Carrier Materials", Agronomy Journal, vol. 75, Mar./Apr. 1983, pp. 181–184.
Thompson, J. A., "Legume Inoculant Production and Quality Control", Report of the Expert Consulation—Food and Agriculture Assoc. of the UN, pp. 15–32.
Van Elsas et al., "Methods for the Introduction of Bacteria Into Soil", Biol. Fertil Soils, 1990, 10: pp. 127–133.
Olsen et al., "Biological Contaminants in North American Rhizobial Legume Inoculants", Argic. Canada Research Station, Alberta, pp. 1–12.
Kucey, "Increased Phosphorus Uptake by Wheat and Field Beans. . . ", Applied and Environmental Microbiology, Dec. 1987, pp. 2699–2703.
Trinick, "Biology", Nitrogen Fixation, vol. 2, Rhizobium, 1982, pp. 114–116.
Anusuya, D. et al., "Interaction Between Rhizobium and Three Soil Fungi", Trop Agric., vol. 62, No. 1, 1985, pp. 13–14.
Halder, A. K. et al., "Solubilization of Inorganic Phosphate By Rhizobium", Folia Microbiologica, vol. 38, 1993, pp. 325–330.
Sethi, R. P. et al., "Effect of Fungi on Nodulation and Nitrogen Fixation in *Pisum sativum*", Mysore J. agric. Sci. 9, 1975, pp. 81–86.
Somasegaran, P. Inoculant production with diluted liquid cultures of Rhizobium spp. and autoclaved peat: evaluation of diluents, Rhizobium spp., peats, sterility requirements. . . Applied and Environemental Microbiology, vol. 50:398–405, 1985.

*Primary Examiner*—David T. Fox
*Assistant Examiner*—Melissa L. Kimball
*Attorney, Agent, or Firm*—Volpe and Koenig, P.C.

[57] ABSTRACT

Methods and compositions for increasing the availability of soluble phosphate and fixed nitrogen for legume:Rhizobium symbioses involving co-inoculating legume seeds with a phosphate-solubilizing soil fungus, *Penicillium bilaii*, and Rhizobium spp. prior to planting. The two types of microorganisms do not appear to compete for nutrients in the rhizosphere of legumes and the *P. bilaii* provides a source of available phosphorus for use by the plant without adversely affecting the nitrogen fixation ability of the Rhizobium spp.; and indeed such ability is enhanced. The invention is used to increase the efficiencies of nodulation, nitrogen fixation and legume crop production.

4 Claims, No Drawings

METHOD OF PREPARING A SEED TREATMENT COMPOSITION

This is a division of application Ser. No. 08/174,335, filed on Dec. 29, 1993, now U.S. Pat. No. 5,484,464.

BACKGROUND OF THE INVENTION

I. Field of the Invention

This invention relates to methods and compositions for increasing nodulation, nitrogen fixation, plant growth and productivity in legumes by inoculation of legumes with Rhizobium spp.

II. Description of the Prior Art

Biological nitrogen fixation is the consequence of a complex and unique symbiosis between Rhizobium bacteria and legume host plants. The first stage in this process is the formation of nodules which occurs by the penetration of the host root hairs by rhizobial bacteria, followed by the formation of a rhizobial infection thread which moves into the host plant's root cortex, after which the rhizobial bacteria are encased in specialized plant cells and then undergo rapid multiplication. Subsequently, the rhizobial bacteria become pleomorphic, their nuclear material degenerates and the resulting bacteroids develop the enzyme complexes, particularly nitrogenase, required for nitrogen fixation (Paul, E. A. and F. E. Clark, 1989, Soil Microbiology and Biochemistry. Academic Press Inc. San Diego. pp. 182–192). The environmental, nutritional and physiological conditions required for rhizobial cell growth and the successful establishment of efficient nitrogen-fixing symbioses are known (Trinick, M. J., 1982, IN W. J. Broughton (Ed.), Nitrogen Fixation Vol. 2, Clarendon Press, Oxford. pp. 76–146).

The amounts of nitrogen fixed by legume:Rhizobium symbioses are significant and, in agricultural situations, can be used to supplement or replace nitrogen fertilizer applications. For example, a typical rate of nitrogen fixation by nodulated alfalfa is up to 250 kg/hectare/year (Atlas, R. M. and R. Bartha, 1981, Microbial Ecology: Fundamentals and Applications, Addison-Wesley Pub. Co. Reading. pp. 364–365) and up to 450 kg/ha/yr by nodulated soybeans (Peoples, M. B. and E. T. Craswell, 1992, Plant Soil 141: 13–39). Consequently, legume crops have become an integral component of most field crop rotations used in agriculture around the world.

Commercial inoculant compositions are commonly used when planting legume crops to ensure that sufficient rhizobial bacteria are present to establish effective nitrogen-fixing systems. Various types of commercial Rhizobium inoculant carriers, compositions and preparations are known including liquids, powders and granules (Thompson, J. A., 1991, IN Report of the Expert Consulation on Legume Inoculant Production and Quality Control (J. A. Thompson, Ed.) Food and Agriculture Association of the United Nations, Rome, pp. 15–32).

It appears that peat is the carrier of choice for the rhizobial inoculant industry (van Elsas, J. D. and C. E. Heijnen, 1990, Biol. Fertil. Soils 10: 127–133). Peat carriers may or may not be sterilized prior to inoculation with rhizobial cells. However, major concerns about the use of non-sterilized peat carriers include potential dissemination of human, animal or plant pathogens (Catroux, G. and N. Amarger, 1992, IN Release of Genetically Engineered & Other Microorganisms (J. C. Fry and M. J. Day) Cambridge University Press, Cambridge. pp. 1–13). It is known that the highest quality, the most stable and most efficacious rhizobial inoculants are manufactured in sterile carriers and are microbially pure (Day, J. M., 1991, IN Report of the Expert Consulation on Legume Inoculant Production and Quality Control (J. A. Thompson, Ed.) Food and Agriculture Association of the United Nations, Rome, pp. 75–85). For these reasons, numerous international regulatory agencies are imposing strict limits on the presence, or the number, of contaminating microorganisms that can be tolerated in commercial rhizobial inoculants (Day, J. M., 1991, IN Report of the Expert Consulation on Legume Inoculant Production and Quality Control (J. A. Thompson, Ed.) Food and Agriculture Association of the United Nations, Rome, pp. 75–85).

Rhizobial titres in contaminated peat-based inoculants are significantly lower than the rhizobial titres in presterilized peat (Date, R. A. and R. J. Roughley, 1977, IN A Treatise on Dinitrogen Fixation (R. W. F. Hardy and A. H. Gibson (Eds.) John Wiley & Sons, New York, pp. 243–275). The reduction of rhizobial titre in unsterilized peat is sometimes due to the presence of contaminating microorganisms which inhibit the growth, or are otherwise antagonistic to the desired rhizobia (Olsen, P. E., W. A. Rice and M. M. Collins, submitted to Soil Biol. Biochem. for publication). In particular, fungal contamination of peat can be a primary factor in reducing the quality and stability of rhizobial inoculants, and the impairing of their nodulation performance (Day, J. M., 1991, IN Report of the Expert Consulation on Legume Inoculant Production and Quality Control (J. A. Thompson, Ed.) Food and Agriculture Association of the United Nations, Rome, pp. 75–85; Sparrow, Jr., S. D. and G. E. Ham, 1983, Agron. J. 75:181–184). Consequently, some commercial rhizobial inoculant production processes have the objectives of eliminating all microbial contamination, including the presence of fungal organisms, from the inoculant carrier substrates prior to inoculation with rhizobial cultures, and then maintaining microbial purity until these products are used to inoculate legume seeds just prior to planting (Day, J. M., 1991, IN Report of the Expert Consulation on Legume Inoculant Production and Quality Control (J. A. Thompson, Ed.) Food and Agriculture Association of the United Nations, Rome, pp. 75–85).

It is known that optimal rhizobial culture performance, and optimal nodulation and nitrogen-fixation processes in legume:Rhizobium symbioses require significant energy expenditures and benefit considerably from supplemental phosphate inputs (Beck, D. P. and D. N. Munns, 1984, Appl. Environ. Microbiol. 47:278–282; Israel, D. W., 1987, Plant Physiol. 84: 835–840). Optimizing the phosphate nutrition of legume crops, i.e. increasing the availability of soluble phosphate for plant uptake, will maximize nitrogen fixation and productivity of legume crops (Adu-Gyamfi, J. J., K. Fujita and S. Ogata, 1989, Plant Soil 119: 315–324; Griffeth, W. K., 1986, IN Phosphorus for Agriculture; A Situation Analysis. Potash & Phosphate Institute, Atlanta. pp. 57–62; Keyser, H. H. and F. Li., 1992, Plant Soil 141: 119–135).

It is known that soil microbial populations include a wide variety of bacterial and fungal species, each of which specifically interact with and affect the growth of all the other species by competing for nutrients and through the production of stimulatory or inhibitory compounds (Curl, E. A. and B. Truelove, 1986, The Rhizophere, Springer-Verlag, pp. 140–141). Generally, two types of interactions occur between soil microorganisms, i.e., growth promotion or growth inhibition. It is clear that these types of interactions are most intense in habitats which contain high levels of nutrients, such as root regions.

It is known that some soil bacteria, primarily Gram-negative strains, are capable of stimulating nodulation by rhizobial bacteria, and are referred to as "nodulation-promoting rhizobacteria" (Polonenko, D. R., J. W. Kloepper and F. M. Scher, European patent application Serial No. 863093498 published Jul. 1st, 1987 under publication no. 0 227 336 Al). However, the mechanisms by which nodulation-promoting rhizobacteria stimulate nodulation have not been discovered.

It is also known that a variety of soil microorganisms are capable of increasing the availability of phosphate for plant uptake (Kucey, R. M. N., H. H. Janzen and M. E. Leggett, 1989, Adv. Agron. 42: 199–228). Several studies have assessed the beneficial effects of "phospho-bacteria" on nodulation and nitrogen fixation in beans (Grimes, H. D. and M. S. Mount, 1984, Soil Biol. Biochem. 16: 27–30) and chickpea (Alagawadi, A. R. and A. C. Gaur, 1988, Plant Soil 105:241–246). In these studies, however, it has not been determined whether the benefits are due to increased phosphate availability or to microbial production of plant growth hormones (Alagawadi, A. R. and A. C. Gaur, 1988, Plant Soil 105:241–246; Grimes, H. D. and M. S. Mount, 1984, Soil Biol. Biochem. 16: 27–30). Furthermore, Badr El-Din et al. (Badr El-Din, S. M. S., M. A. Khalafallah, and H. Moawad, 1986, Z. Pflanzenernaehr. Bodenk. 149:130–135) found that dual inoculation of "phospho-bacteria" and *Rhizobium japonicum* (also known as *Bradyrhizobium japonicum*) had no effect on nodule dry weight or nitrogen uptake of soybeans in a field experiment.

A unique sub-group of soil fungi which establish symbiotic relationships with plants by penetrating the roots and then forming specialized fungal structures within the host plant root systems, i.e. vesicular-arbuscular mycorrhizae (VAM), can also significantly improve nodulation and nitrogen fixation by increasing phosphate availability to mycorrhizal legumes (Barea, J. M. and C. Azcon-Aguilar, 1983, Adv. Agron. 36:1–54). VAM absorb soluble phosphate from the soil solution into their mycelia, and then translocate the phosphate to within the plant roots (Harley, J. L. and S. E. Smith, 1983, Mycorrhizal Symbiosis. Academic Press, London. pp. 78–84). VAM do not dissolve solid native or precipitated phosphates (Harley, J. L. and S. E. Smith, 1983, Mycorrhizal Symbiosis. Academic Press, London. pp. 84–86).

On the other hand, rhizobial bacteria are weakly competitive within soil microbial populations and, consequently, tend to be negatively affected by the presence of antibiotic-producing microorganisms. It appears that the most common antibiotic-synthesizing microorganisms are most abundant in the root regions of cultivated plants, and generally are species of Penicillium, Streptomyces, Trichoderma, Aspergillus, Bacillus and Pseudomonas (Curl, E. A. and B. Truelove, 1986, The Rhizophere, Springer-Verlag, p. 153–154). A study with a forage legume demonstrated that certain antibiotic-producing fungi species, particularly in the genus Penicillium, inhibited the activity of rhizobial bacteria and the formation of nodules (Holland, A. A. and C. A. Parker, 1966, Plant Soil 25: 329–340). Furthermore, a study with a grain legume found that a Penicillium sp. significantly reduced nitrogen fixation (Downey, J. and C. van Kessel, 1990, Biol. Fertil. Soils 10:194–196). They hypothesized that the Penicillium produced organic acids which acidified the rhizosphere and thus interfered with the rhizobial performance.

It has been clearly demonstrated that the soil fungus *Penicillium bilaii* increases the availability of soluble phosphate for plant uptake by dissolving solid forms of phosphate (Kucey, R. M. N., U.S. Pat. No. 5,026,417 issued Jun. 25, 1991). *P. bilaii* does not penetrate into plant roots but rather, colonizes root surfaces and the immediate rhizosphere. This organism is registered under the Canadian Fertilizers Act (Reg. Nos. 900025A, 920064A) as a fertilizer supplement for use to increase phosphate availability to wheat, canola, pea and lentil. Kucey (Kucey, R., 1987, Appl. Environ. Microbiol. 53:2699–2703) found that dual-inoculation of field beans with *P.bilaii* and *R.phaseoli* did not have statistically significant effects on phosphate uptake or bean plant dry weights, when grown in autoclaved soil in a greenhouse trial.

Moreover, Downey and van Kessel (Downey, J. and C. van Kessel, 1990, Biol. Fertil. Soils 10:90–194–196) demonstrated that in greenhouse trials, nitrogen fixation and assimilation were significantly reduced in pea plants that were "dual-inoculated" with *P. bilaii* and *Rhizobium leguminosarum* bv. viceae when compared to peas inoculated with *R. leguminsarum* bv. viceae alone.

SUMMARY OF THE INVENTION

An object of the present invention is to enable legume crops to fix nitrogen at high rates in order to improve crop yields.

Another object of the invention is to improve the property of Rhizobium spp. to assist legumes in the fixing of nitrogen for use by the plants.

Yet another object of the invention is to provide a treatment for legume seeds to enable plants grown from the seeds to fix nitrogen at a high rate.

Yet another object of the invention is to make insoluble phosphate more readily available for uptake by legume plants while infected with Rhizobium spp. without diminishing the beneficial effects of the Rhizobium spp.

Still another object of the invention is to provide a method and treatment for increasing nodulation, nitrogen fixation, plant growth and productivity in legumes.

This invention is based on the discovery of methods of increasing the nodulation, nitrogen fixation, growth and productivity of legume crops by increasing the availability of soluble phosphate for plant uptake by co-inoculating the crops prior to planting with a phosphate-solubilizing soil fungus, *Penicillium bilaii*, and an appropriate Rhizobium spp.

Thus, one aspect of this invention provides a method for co-inoculating legumes with a phosphate-solubilizing soil fungus and a selected Rhizobium Sp.

This invention is also based on the discovery of a method for reliably and consistently producing unique biological inoculant compositions which are microbially pure and contain high titres of a phosphate-solubilizing soil fungus, i.e., *Penicillium bilaii* and a selected Rhizobium sp.

Thus, another aspect of this invention is the disclosure of methods of preparing microbially pure inoculant compositions containing a selected soil fungus and a selected Rhizobium sp. by inoculating the two cultures into a sterile carrier and then curing the formulated inoculant under defined conditions.

This invention also relates to inocula prepared according to the method of the present invention and to seeds precoated with the inocula as well as to the inoculation of soil with the inocula.

As used herein, the term "Rhizobium spp." refers to all microorganisms present in the genus Rhizobium and in the genus Bradyrhizobium. By the term "appropriate Rhizobium spp." we mean a Rhizobium sp. that is appropriate for the particular legume being subjected to the invention. Rhizobium spp. appropriate for particular legumes are well known to persons skilled in this art. Various suitable rhizobial strains can be obtained from the following sources: (1) The American Type Culture Collection, 12301 Parklawn Drive, Rockeville, Md., USA 20852; (2) Dr. W. Rice, Agriculture Canada Research Section, P. O. Box 29, Beaverlodge, Alberta, Canada, TOH OCO; and (3) Yellowstone Valley Chemicals Inc., 2341 1st Avenue North, Billings, Mont. USA 59101.

As used herein, the term "*Penicillium bilaii*" refers to all phosphate-solubilizing soil fungal strains belonging to this specific taxonomic classification. Known strains of this microorganism have been previously deposited at the American Type Culture Collection in Rockville, Md., USA under the deposit numbers ATCC 18309, 20851, and 22348. The fungus *P.bitaii* is also fully described in U.S. Pat. No. 5,026,417 mentioned earlier (the disclosure of which is incorporated herein by reference). in the Kucey patent and in some scientific publications, *Penillium bilaii* is referred to as *Penicillium bilaii*, but the former term is used throughout this disclosure. Suitable strains of *Penicillium bilaii* are commercially available from Philom Bios Inc., 318–111 Research Drive, Saskatoon, Saskatchewan, Canada in products sold under the trademarks "PROVIDE" and "PB-50". Further effective strains can be found by following the testing procedures in the Examples of the Kucey patent.

As used herein, the term "cfu" refers to colony-forming-units formed on agar media by microorganisms.

DETAILED DESCRIPTION OF PREFERRED EMBODIMENTS OF THE INVENTION

Despite the conclusions by Downey and van Kessel referred to earlier, we have surprisingly discovered that co-inoculating legume seeds with a phosphate-solubilizing soil fungus, *Penicillium bilaii*, and an appropriate Rhizobium sp. enhances the nodulation and nitrogen assimilation processes in the co-inoculated legume plants compared to uninoculated legumes or legumes inoculated only with the Rhizobium sp., and that the co-inoculation also increases legume crop productivities.

The nodulation and nitrogen fixation processes in legume:Rhizobium symbioses require substantial energy expenditures by the plant host and, therefore, considerable soluble phosphate is required to ensure that these processes proceed at optimal rates. Since *P. bilaii* has the properties of solubilizing insoluble phosphate from native and applied solid forms, e.g. precipitated calcium phosphate, rock phosphate, and various types of phosphate fertilizers, the essence of the present invention relates to increased availability of soluble phosphate and fixed nitrogen to legume:Rhizobium symbioses as a consequence of *P. bilaii* activity, such that the rhizobial benefits to legume nitrogen fixation, plant growth and productivity are maximized.

Co-inoculation of legume seeds with *P. bilaii* and a rhizobial bacteria and the resulting benefits to the legume:Rhizobium symbiosis are not limited to a particular inoculant carrier type, a particular inoculation process, or to a particular legume:Rhizobium symbiosis but rather, can be accomplished in a variety of ways including first inoculating selected legume seeds with a suspension of *P. bilaii* spores, allowing the seeds to dry and then inoculating the seeds with a slurry of a peat-based rhizobial inoculant containing an appropriate Rhizobium sp.

Alternatively, if the peat-based rhizobial inoculant contains a sticking agent, the inoculant can then be applied directly to legume seeds that have previously been inoculated with *P. bilaii*. A liquid rhizobial inoculant can be applied directly to legume seeds which were pre-inoculated with *P. bilaii*. In addition, the *P. bilaii* spores can be mixed with the rhizobial inoculant and water into a slurry which is then applied to the legume seeds.

It is preferred that a range of $1 \times 10^2$ to $1 \times 10^4$ cfu of *P. bilaii* be applied to each legume seed. It is also preferred that legumes with small seeds e.g., alfalfa, receive a range of $1 \times 10^3$ to $1 \times 10^5$ cfu/seed of the appropriate Rhizobium sp., legumes with medium-sized seeds, e.g. lentils, receive a range of $1 \times 10^4$ to $1 \times 10^6$ cfu/seed of the appropriate Rhizobium Sp., while legumes with large seeds e.g., peas, receive a range of $1 \times 10^5$ to $1 \times 10^7$ cfu/seed of the appropriate Rhizobium sp. Co-inoculated legume seeds are handled and planted in the same manner as legume seeds inoculated only with rhizobial inoculants. We have found that *P. bilaii* does not affect the number of rhizobial cells coated onto legume seeds during the co-inoculation process.

Examples of legume seeds that can be co-inoculated with *P. bilaii* plus the appropriate Rhizobium sp. are listed in Table 1 below.

TABLE 1

| Legume inoculation groups | | |
|---|---|---|
| Plant Host | | |
| Common Name | Scientific Name | Rhizobium Spp. |
| Alfalfas | Medicago spp. | *Rhizobium meliloti* |
| Clovers | Trifolium spp. | *Rhizobium trifolii* |
| Peas | Pisum spp. | *Rhizobium leguminosarum* |
| Lentils | *Lens culinaris* | *Rhizobium leguminosarum* |
| Beans | Phaseolus spp. | *Rhizobium phaseoli* |
| Soybeans | Glycine max | *Bradyrhizobium japonicum* |
| Vetches | Vicea spp. | *Rhizobium leguminosarum* |
| Lupines | Lupinus spp. | *Rhizobium lupinus* |

It should be noted, however, that the process of the invention described herein is not restricted to the legume crops listed in Table 1 but rather, is applicable to any legume:Rhizobium symbiosis resulting from the deliberate coating of a legume seed with the appropriate Rhizobium sp. prior to planting (e.g., peanuts, i.e., *Arachis hypogaea*, inoculated with a "cowpea-type" Rhizobium spp.).

Surprisingly, we have found that neither *P. bilaii* nor Rhizobium spp. interfere with each other's viability or performance on various legume seeds. Typically, all co-inoculated legumes form nodules and more than 90% of their roots are colonized by *P. bilaii*. Furthermore, the nodule ratings of co-inoculated legumes are considerably higher than those of plants inoculated only with a Rhizobium sp. Co-inoculation of legumes with the two organisms typically increases the dry weights of nodules formed up to 100% more than the dry weights of nodules formed by legumes inoculated only with the Rhizobium spp. We also found that co-inoculated legumes fix and assimilate significantly more nitrogen compared to legumes inoculated only with a Rhizobium sp.

When grown under field conditions where phosphate fertilizer applications are required for optimal plant productivity, co-inoculated legumes typically can produce about 200 kg more grain per hectare, i.e., 3 bushels/acre more, than plants inoculated only with the Rhizobium sp. Forage legumes typically produce 750 kg/ha, i.e., 670 lbs/ac more hay than plants inoculated only with the Rhizobium sp..

It has been found that supplementing co-inoculated legume seeds with commercial phosphate fertilizers ensures a source of solid phosphate for solubilization by *P. bilaii* and, consequently, consistently increases legume crop productivity in soils where supplemental phosphate applications are recommended by the results of soil testing. Alternatively, if the soil test results indicate that supplemental phosphate applications are not required, co-inoculating legume seeds with *P. bilaii* and the appropriate Rhizobium sp. will ensure that adequate levels of soluble phosphate are available for legume plant uptake throughout the growing season.

We have also surprisingly found that microbially pure inoculant compositions containing both *P. bilaii* and a single strain of Rhizobium sp. can be prepared and stored for extended periods of time without adversely affecting the viability, stability and performance of either organism, or without affecting the quality of the inoculant composition.

The present invention discloses methods for preparing microbially pure inoculant compositions containing *P. bilaii* and a Rhizobium sp. For clarity, the compositions containing *P. bilaii* and a Rhizobium sp. are defined in this document as "tandem" compositions. A "tandem" inoculant composition can be typically prepared as follows.

Powdered peat with a moisture content range of 6% to 20%, with or without a sticker, is packaged in plastic bags and then sterilized in a manner that ensures the complete absence of contaminating microorganisms. Examples of stickers which can be blended with peat include alginate, graphite, gum arabic and methyl cellulose. An example of a suitable sterilization process is exposing the packaged peat to 5.5 megarads of gamma irradiation. Using aseptic technique, a suspension of *P. bilaii* spores is transferred into the sterilized bags of peat such that the final concentration of spores after the composition step is completed is in the range of $1\times10^4$ to $1\times10^7$ cfu/g (i.e., Log 4 to Log 7 cfu/g) but preferably $3.3\times10^5$ cfu/g (i.e., Log 5.52). Then, a suspension of Rhizobium sp. cells is added using aseptic technique, to the peat composition so that the titre of Rhizobium cells after the composition step is completed is in the range of $1\times10^5$ to $1\times10^8$ cfu/g (i.e., Log 5 to Log 8 cfu/g) but preferably $1.8\times10^7$ cfu/g (i.e., Log 7.25 cfu/g). The total volume of *P. bilaii* spore suspension and Rhizobium sp. suspension added to each bag is such that the final moisture content of the "tandem" composition will not exceed 50%. The preferred moisture content range of the formulated "tandem" inoculant compositions is in the range of 40% to 45%.

After the two microbial suspensions are well-mixed with the peat carrier by massaging the bags, the bags are cured at a temperature range of 20° C. to 30° C. for a period of 14–35 days, depending on the rhizobial strain, prior to storage. After the "tandem" composition is cured, the target titre for *P. bilaii* is equal to or greater than $1\times10^7$ cfu/g (i.e., Log 7.00) while the target titre for Rhizobium cells is equal to or greater than $5\times10^8$ cfu/g (i.e., Log 8.69 cfu/g). For slower-growing Rhizobium or Bradyrhizobium strains, the "tandem" inoculant compositions should be cured for up to five weeks before storage.

The present invention also relates to methods for the use of microbially pure "tandem" inoculant compositions containing *P. bilaii* and a Rhizobium sp. If a sticker is incorporated into the peat carrier prior to sterilization, the "tandem" inoculant composition can be directly applied to the appropriate legume seeds or, alternatively, the seeds can be dampened prior to the inoculation step. This formulation can also be processed into a slurry and then applied onto seeds. If a sticker is not incorporated into the "tandem" inoculant composition, then the "tandem" inoculant composition can be made into a slurry by adding the composition plus a sticking agent to a volume of water and mixing well before inoculating seeds. Examples of stickers which can be added to inoculant slurries include alginate, gum arabic, honey, methyl cellulose, skim milk and wallpaper paste. Legume seeds inoculated with "tandem" inoculant compositions are handled and planted in the same manner as legume seeds inoculated only with rhizobial inoculants.

Further specific embodiments of this invention are illustrated by the following non-limiting Examples.

EXAMPLE 1

A study of the effects of co-inoculating *P. bilaii* and Rhizobium spp. on on-seed inoculant population dynamics was conducted using seeds of the pea cultivar Trapper. The seeds were surface-sterilized by soaking each 500 g lot of seed in 95% ethanol for 30 seconds, followed by soaking in 1.5% hypochlorite for 5 minutes. The seeds were then rinsed 5 times with sterile distilled water. Three seed inoculant treatments, *P. bilaii*, *R. leguminosarum* bv. viceae, and *P. bilaii* plus *R. leguminosarum* bv. viceae were used. The 500 g lots of seed were placed in heavy plastic bags. The appropriate amount of each inoculant was added to the seed and mixed vigorously until even coverage of the seed was obtained. The inoculants *P. bilaii* (ATCC Strain No. 20851) and *R. leguminosarum* bv. viceae (USDA Strain No. 2449) were supplied by Philom Bios Inc., Saskatoon, Canada. Each seed treatment was replicated three times.

Standard plate count methods were used to enumerate the numbers of colony-forming-units of *P. bilaii* and *R. leguminosarum* bv. viceae. Five-gram samples of inoculated seed were placed in 50 ml of a 0.1% TWEEN (Trademark) solution, sonicated for 2 minutes, then vortexed for 1 minute. For each sample, ten-fold dilutions ($10^3$–$10^4$) were prepared using a 0.1% TWEEN solution. Dilution tubes were vortexed between transfers. Two samples from each of the three seed treatment replicates and 2 duplicates from each sample were plated for a total of 12 plates for each treatment dilution.

The standard potato dextrose agar (PDA-PP) medium used to plate *P. bilaii* treatments contained precipitated phosphate (5 g $K_2HPO_4$ $L^{-1}$ and 10 g $CaCl_2.2H_2O$ $L^{-1}$) to aid in the identification of *P. bilaii* colonies. The standard yeast extract mannitol (YEM-CR) medium used to plate *R. leguminosarum* bv. viceae treatments contained 0.04 g $L^{-1}$ cycloheximide to inhibit fungal growth and 2.5 ml $L^{-1}$ congo red (1%) to aid in the identification of *R. leguminosarum* bv. viceae colonies. Dilutions of the *P. bilaii* plus *R. leguminosarum* bv. viceae treatment were plated on both PDA-PP and YEM-CR media to obtain separate counts of *P. bilaii* and *R. leguminosarum* bv. viceae, respectively.

Colonies of *P. bilaii* were counted after PDA-PP plates were incubated at room temperature (22° C.) for 6 to 7 days, while colonies of *R. leguminosarum* bv. viceae were counted after YEM-CR plates were incubated at 30° C. for 4 to 5 days. Analysis of variance and LSD values for the data were calculated. The remainder of the inoculated seed was stored at room temperature (22° C.) for 1 week, and the entire procedure repeated. The data are reported in Tables 2 and 3.

TABLE 2

Effect of inoculation with P. bilaii or R. leguminosarum bv. viceae, singly or in combination, on the population of P. bilaii on pea seed at time 0 and 1 week after inoculation.

| Inoculant Treatment* | P. bilaii seed population ($\times 10^3$ cfu/g seed) | |
|---|---|---|
| | Time Zero | One Week |
| P. bilaii | 54.6 | 5 |
| P. bilaii plus R. leguminosarum | 125 | 6.8 |
| LSD (P $\leq$ 0.05) | 129.5 | 11.9 |

*P. bilaii applied to seed at $2 \times 10^5$ cfu/g seed.

Co-inoculation of pea seed with P. bilaii and R. leguminosarum bv. viceae did not affect the population of P. bilaii on pea seed when compared to inoculation with P. bilaii alone at time 0 or 1 week after inoculation (Table 2). The population of P. bilaii on pea seed inoculated with or without R. leguminosarum bv. viceae decreased after inoculated seed was stored for 1 week at room temperature.

TABLE 3

Effect of inoculation with P. bilaii or R. leguminosarum bv. viceae, singly or in combination, on the population of R. leguminosarum bv. viceae on pea seed at time 0 and 1 week after inoculation.

| Inoculant Treatment* | R. leguminosarum seed population ($\times 10^3$ cfu/g seed) | |
|---|---|---|
| | Time Zero | One Week |
| R. leguminosarum | 143.3 | 13.5 |
| R. leguminosarum plus P. bilaii | 153.3 | 17.4 |
| LSD (P $\leq$ 0.05) | 30.6 | 4.6 |

*R. leguminosarum applied at $7 \times 10^5$ cfu/g seed.

Co-inoculation of pea seed with P. bilaii and R. leguminosarum bv. viceae did not affect the population of R. leguminosarum bv. viceae on pea seed when compared to inoculation with R. leguminosarum bv. viceae alone at time 0 or 1 week after inoculation (Table 3). The population of R. leguminosarum bv. viceae on pea seed, inoculated with or without P. bilaii decreased after seed was stored for 1 week at room temperature.

EXAMPLE 2

The effects of P. bilaii and Rhizobium spp. on their population dynamis in legume roots were assessed with pea plants using the inoculant treatments prepared for Example 1. One pea seed from each inoculant treatment was placed into 50-ml plastic tubes filled with sterile potting mix which was pre-soaked with sterile distilled water. Each treatment was replicated 10 times. The tubes were placed on a growth table and the plants harvested 1 week after emergence. Intact root systems were removed from each tube, excess potting mix gently shaken off, and the main tap root was cut into 10 equal-length segments. Starting with the segment closest to the cotyledon, segments were placed on media plates in a clockwise fashion finishing with the bottom segment. P. bilaii treatment segments were placed on PDA-PP medium and R. leguminosarum bv. viceae treatment segments were placed on YEM-CR medium. Medium compositions were as described in Example 1. Twenty tubes of the P. bilaii plus R. leguminosarum bv. viceae treatment were planted to allow 10 roots to be plated on PDA-PP medium for P. bilaii counts, and 10 on YEM-CR medium for R. leguminosarum bv. viceae counts.

PDA-PP plates were incubated for 6 to 7 days at room temperature (22° C.), and YEM-CR plates were incubated at 30° C. for 4 to 5 days. The number of root segments on each plate colonized with the appropriate organism, P. bilaii or R. leguminosarum bv. viceae, were counted to obtain percent of root colonized for each treatment replicate. Analysis of variance and LSD values for the data were calculated. The entire experiment was repeated using inoculated seed stored for 1 week at room temperature (22° C.) from the seed population dynamics study.

Inoculation of pea seed with P. bilaii resulted in 90 to 91% colonization of pea root rhizospheres by P. bilaii, whether inoculated singly or in combination with leguminosarum bv. viceae at time 0 (Table 4). Rhizosphere colonization by P. bilaii was not affected by storing inoculated seed for 1 week at room temperature.

TABLE 4

Effect of inoculation with P. bilaii or R. leguminosarum bv. viceae, singly or in combination, on the colonization of pea root rhizosphere by P. bilaii with seed planted at time 0 and 1 week after inoculation.

| Inoculant Treatment | P. bilaii rhizosphere colonization (% of root colonized) | |
|---|---|---|
| | Time Zero | One Week |
| P. bilaii | 91 | 88 |
| P. bilaii plus R. leguminosarum | 90 | 89 |
| LSD (P $\leq$ 0.05) | 8 | 11 |

Co-inoculation of pea seed with R. leguminosarum bv. viceae resulted in 95 to 97% colonization of pea root rhizosphere by R. leguminosarum bv. viceae, when inoculated singly or in combination with P. bilaii at time zero (Table 5). Rhizosphere colonization by R. leguminosarum bv. viceae declined after inoculated seed was stored for one week at room temperature, but still was not affected by co-inoculation with P. bilaii.

TABLE 5

Effect of inoculation with P. bilaii or R. leguminosarum bv. viceae, singly or in combination, on the colonization of pea root rhizosphere by R. leguminosarum bv. viceae with seed planted at time 0 and 1 week after inoculation.

| Inoculant Treatment | R. leguminosarum rhizosphere colonization (% of root colonized) | |
|---|---|---|
| | Time Zero | One Week |
| P. bilaii | 95 | 78 |
| R. leguminosarum plus P. bilaii | 97 | 79 |
| LSD (P $\leq$ 0.05) | 8 | 11 |

EXAMPLE 3

A growth-chamber study was conducted with field pea (Pisum sativum cv "Trapper") to assess the effects of 4 inoculant treatments i.e., uninoculated control, P. bilaii, R. leguminosarum bv. viceae, and co-inoculated P. bilaii and R. leguminosarum bv. viceae, on nodulation, nitrogen fixation, phosphate assimilation and plant growth. The P. bilaii strain was ATCC Strain No. 20851 in all cases. The effects of supplemental phosphate on the inoculant performance were assessed by planting inoculated seed in soils containing 2 phosphate fertilizer treatments i.e., unfertilized control and 10 mg phosphate/kg$^{31}$ $^1$ soil.

Three hundred grams of washed gravel were placed in the bottom of each 15-cm pot followed by 800 g of soil. Supplemental phosphate, where used, was applied as a suspension of $Ca(H_2PO_4)_2$ (triple-super-phosphate) in distilled water. Ten milliliters of the phosphate suspension were applied evenly across the surface of the first 800-g layer of soil. An additional 700 g of soil was then placed into each pot. Pots were watered to 80% field capacity by weight and allowed to equilibrate for 2 days. Six pea seeds with the appropriate inoculant treatment were planted in each pot. Each treatment was replicated 7 times. Pots were transferred to a Conviron PGV36/M10 growth chamber at the University of Saskatchewan Phytotron Centre and were arranged in a randomized complete block design.

The growth chamber conditions were set to simulate average temperature and light level increases which occur during outdoor conditions in central Saskatchewan for the months of mid-May through mid-July. A dawn-dusk feature brought the lighting system to full-on or full-off positions gradually. Maximum light intensity of 425 W m$^{-2}$ was reached by midday. Initial photoperiod was 17 hours of light, followed by 18 hours, and finishing again at 17 hours of light by the end of the experiment. At the start of the experiment, minimum (night) and maximum (day) temperatures were 5° C. and 17.2° C., respectively. The minimum and maximum temperatures were gradually increased to 16° C. and 21° C., respectively, by the end of the experiment.

Two weeks after emergence, seedlings were thinned to 1 plant per pot. Pots were initially allowed to drop to one-third field capacity before watering by weight to two-thirds field capacity. Pots were maintained between one-half and three-quarters field capacity from 4 weeks after emergence until harvest. A micronutrient solution was applied to each pot every 2 weeks until harvest. Supplemental phosphate or nitrogen was not applied.

Each pea plant was harvested as the first flower bud opened. Days to harvest ranged from 41 to 51 days after planting. Plant shoots were harvested, dried, weighed, and ground. Roots were gently washed to remove soil, placed in plastic bags, and frozen. Nodulation was rated once all the pots were harvested. Roots were gently teased apart in a shallow tray of water and nodulation per plant was rated using a 1 to 10 scale. The rating scale for inactive nodules was as follows: 1, no nodules; 2, fewer than 25 inactive nodules; and 3, greater than 25 inactive nodules. Pink to red colored nodules were considered active. The rating scale for active nodules was as follows: 4, less than 50 active nodules; 5, 50 to 99 active nodules; 6, 100 to 149 active nodules; 7, 150 to 199 active nodules; 8, 200 to 249 active nodules; 9, 250 to 299 active nodules; and 10, greater than 300 active nodules. The roots were then dried, weighed, and ground. Subsamples of the ground tissue were analyzed for total nitrogen and phosphate concentration, and the uptakes were determined. Analysis of variance and single degree of freedom contrasts of the data were performed using the General Linear Model procedure of the Statistical Analysis Systems package (SAS Institute Inc., 1988). The effects of the inoculant treatments on nodulation and nitrogen assimilation are recorded in Table 6.

TABLE 6

Effect of inoculation with Penicillium bilaii or Rhizobium leguminosarum bv. viceae, singly or in combination at two phosphate levels, on nodulation and nitrogen assimilation by field pea in a growth chamber experiment.

| Treatment | Nodule rating 1–10 | Nitrogen assimilation mg plant$^{-1}$ | | |
|---|---|---|---|---|
| | | Shoot | Root | Total |
| Unfertilized | | | | |
| Control | 1.4 | 43.6 | 32.5 | 76.1 |
| R. leguminosarum | 6.1 | 53.9 | 60.5 | 114.3 |
| P. bilaii | 1.7 | 47.1 | 70.9 | 118.0 |
| Co-inoculation | 8.1 | 60.0 | 79.7 | 139.7 |
| 10 mg P/kg$^{-1}$ soil | | | | |
| Control | 2.1 | 46.5 | 68.6 | 115.1 |
| R. leguminosarum | 7.7 | 60.4 | 76.7 | 137.1 |
| P. bilaii | 2.1 | 48.1 | 74.7 | 122.7 |
| Co-inoculation | 8.1 | 64.7 | 82.6 | 147.4 |
| LSD (P ≦ 0.05) | 1.2 | 10.3 | 9.3 | 13.4 |

The data demonstrates that when supplemental phosphate was not applied, pea receiving the co-inoculation treatment had a higher nodule rating and assimilated 22% more nitrogen than plants inoculated only with R. leguminosarum bv. viceae. These observations contradict those made by Downey and van Kessel who found that pea "dual-inoculated" with P. bilaii and R. leguminosarum bv. viceae fixed 26% less nitrogen than plants inoculated only with R. leguminosarum bv. viceae (Downey, J. and C. van Kessel, 1990, Biol. Fertil. Soils 10:194–196).

When supplemental phosphate was supplied, the nodule rating in co-inoculated plants was 5% higher than that for the plants inoculated with R. leguminosarum bv. viceae. Pea receiving the co-inoculation treatment and grown in soil supplemented with triple-super-phosphate assimilated 7.5% more nitrogen than pea inoculated with R. leguminosarum bv. viceae only. These observations also contradict those of Downey and van Kessel who found a 14% decrease in nitrogen fixation in co-inoculated pea that received phosphate fertilizer compared to fertilized pea that were inoculated only with R. leguminosarum bv. viceae.

The effects of the inoculant treatments on phosphate assimilation are recorded in Table 7. When grown without supplemental phosphate, co-inoculated pea assimilated 24% more total phosphate than pea inoculated with R. leguminosarum bv. viceae. When supplemental phosphate was added to the inoculant treatments, co-inoculated plants contained 7.5% more total phosphate than those inoculated with R. leguminosarum bv. viceae only.

TABLE 7

Effect of inoculation with P. bilaii or R. leguminosarum bv. viceae, singly or in combination at two phosphate levels, on phosphate uptake of pea in a growth chamber experiment.

| Treatment | Phosphate uptake mg plant$^{-1}$ | | |
|---|---|---|---|
| | Shoot | Root | Total |
| Unfertilized | | | |
| Control | 7.1 | 2.5 | 9.6 |
| R. leguminosarum | 7.5 | 4.5 | 12.0 |
| P. bilaii | 8.0 | 5.2 | 13.3 |
| Co-inoculation | 9.2 | 5.7 | 14.9 |

TABLE 7-continued

Effect of inoculation with *P. bilaii* or *R. leguminosarum* bv. *viceae*, singly or in combination at two phosphate levels, on phosphate uptake of pea in a growth chamber experiment.

| Treatment | Phosphate uptake mg plant$^{-1}$ | | |
|---|---|---|---|
| | Shoot | Root | Total |
| 10 mg P/kg$^{-1}$ soil | | | |
| Control | 8.0 | 5.5 | 13.5 |
| R. leguminosarum | 9.2 | 6.0 | 15.2 |
| P. bilaii | 9.5 | 6.5 | 15.9 |
| Co-inoculation | 9.8 | 7.6 | 17.4 |
| LSD (P $\leq$ 0.05) | 1.3 | 1.3 | 1.8 |

The effects of the inoculant treatments on tissue dry weights are recorded in Table 8. In the absence of supplemental phosphate, the increase in shoot dry weight of co-inoculated pea compared to pea inoculated with *R. leguminosarum* bv. *viceae* alone, was 20% while the increase in the dry weight of root tissues was 39%. When supplemental phosphate was added to the inoculant treatments, the increases in shoot and root dry weights of co-inoculated plants compared to the *R. leguminosarum* bv. *viceae* were 7% and 13% respectively.

TABLE 8

Effect of inoculation with *P. bilaii* or *R. leguminosarum* bv. *viceae*, singly or in combination at two phosphate levels, on pea dry tissue weight in a growth chamber experiment.

| Treatment | Dry tissue weight mg plant$^{-1}$ | | |
|---|---|---|---|
| | Shoot | Root | Total |
| Unfertilized | | | |
| Control | 3.21 | 1.49 | 4.70 |
| R. leguminosarum | 3.48 | 2.60 | 6.08 |
| P. bilaii | 3.51 | 3.45 | 6.96 |
| Co-inoculation | 4.21 | 3.62 | 7.83 |
| 10 mg P/kg$^{-1}$ soil | | | |
| Control | 3.74 | 3.06 | 6.80 |
| R. leguminosarum | 4.23 | 3.00 | 7.23 |
| P. bilaii | 4.13 | 3.50 | 7.63 |
| Co-inoculation | 4.53 | 3.40 | 7.93 |
| LSD (P $\leq$ 0.05) | 0.37 | 0.54 | 0.67 |

EXAMPLE 4

Field trials with field pea (*Pisum sativum* cv "Trapper") were planted at 6 locations in Saskatchewan and Manitoba in 1989. The locations of the sites were identified as follows (legal description in brackets):

1. Rural Municipality #284, Outlook, Saskatchewan (NW16-29-8-W3),
2. Rural Municipality #347, Biggar, Saskatchewan (NE6-37-14-W3),
3. Rural Municipality #373, Aberdeen, Saskatchewan (NW7-40-2-W3),
4. Rural Municipality #367, Quill Lake, Saskatchewan (SE28-37-15-W2),
5. Rural Municipality #368, Watson, Saskatchewan (SE2-39-17-W2),
6. Rural Municipality of Roland, Homewood, Manitoba (NW31-5-3-W1).

The research sites selected generally had low levels of soil phosphate and nitrogen, and had never been cropped with pea or lentil. Prior to seeding, basal treatments of nitrogen, potassium, or sulfur were broadcast at each field site according to soil test recommendations to ensure adequate nutrient supply and to highlight crop response to phosphate. Ethalfluralin was applied at each field site for weed control, by cross-incorporation to a depth of 8 cm with a tandem disc followed with diamond tooth harrows.

The research trials were arranged in a split-plot experimental design with 5 replications. Four seed inoculant sub-plot treatments i.e., uninoculated control, *P. bilaii* (ATCC No. 20851), *R. leguminosarum* bv. *viceae*, co-inoculated *P. bilaii* plus *R. leguminosarum* bv. *viceae*, were imposed over 2 phosphate fertilizer mainplot regimes i.e., 0 and 20 kg phosphate ha$^{-1}$ applied as seed-placed triple-super-phosphate (0-45-0). The trials were seeded with a small-plot double disc seed drill specially constructed to minimize contamination between seed inoculant treatments. Pea seed was planted at depths ranging from 2.5 to 5.0 cm, depending upon soil moisture at each location. Each plot consisted of 6 treatment rows 15-cm apart bordered by 2 guard rows of triazine-tolerant canola to eliminate edge effects. Each trial was bordered by untreated plots of pea, also to eliminate edge effects. The trials were sprayed during the growing season with foliar herbicides or hand weeded as necessary to remove weeds not eliminated by the ethalfluralin.

Prior to harvesting, the ends of each plot were trimmed to remove edge effects. The remainder of each plot was then harvested with a small plot combine to measure grain yield. Harvested grain was cleaned, weighed, and the percent moisture of each sample measured. Grain yields adjusted for a constant 16.0% seed moisture were calculated and used in the data analysis.

The overall effects of the inoculant treatments on pea grain yields in the 1989 field research trials are summarized in Table 9.

TABLE 9

Effect of inoculation with *P. bilaii* or *R. leguminosarum* bv. *viceae*, singly or in combination at two phosphate levels, on pea grain yields in Western Canada in 1989.

| Treatment | Grain yield (kg ha$^{-1}$) |
|---|---|
| Unfertilized | |
| Control | 2754 |
| R. leguminosarum | 2999 |
| P. bilaii | 2662 |
| Co-inoculation | 3197 |
| 20 kg phosphate fertilizer ha$^{-1}$ | |
| Control | 3027 |
| R. leguminosarum | 3135 |
| P. bilaii | 2934 |
| Co-inoculation | 3405 |
| LSD (P $\leq$ 0.05) | |
| Phosphate fertilizer | 216 |
| Inoculant | 120 |

When supplemental phosphate was not applied to the inoculant treatments, plots planted with co-inoculated pea produced 6.6% more grain than plots planted with pea inoculated only with *R. leguminosarum* bv. *viceae*. This yield increase is equivalent to 3 bu/ac more produced by the co-inoculated pea compared to those inoculated only with *R. leguminosarum* bv. *viceae*.

In plots receiving 20 kg phosphate ha$^{-1}$ as triple-superphosphate fertilizer, co-inoculated pea yielded 8.6% more grain than pea inoculated only with *R. leguminosarum* bv. viceae. This yield increase is equivalent to 4 bu/ac more produced by the co-inoculated pea compared to those inoculated only with *R. leguminosarum* bv. viceae.

EXAMPLE 5

A field trial with alfalfa was planted at a location in Alberta in 1989 to assess the effects of *P. bilaii* (strain ATCC 20851) and *R. meliloti* strain NRG-185 treatments on nodulation and hay production by alfalfa. The site was located in the County of Grande Prairie at the Agriculture Canada Research Station in Beaverlodge (legal description is NW36-71-10-W6). Alfalfa seed inoculated with 1 of 4 seed inoculant treatments i.e., uninoculated control, *R. meliloti* strain NRG-185, *P. bilaii,* co-inoculation with *P. bilaii* plus *R. meliloti* NRG-185, were imposed over 2 phosphate fertilizer mainplot regimes i.e., 0 and 10 kg ha$^{-1}$, applied as seed-placed triple-super-phosphate (0-45-0). The treatment rows were 20 feet long and were arranged in a complete-randomized-block design. Each treatment was replicated 6 times.

The effects of the inoculant on hay production in the second year after planting are presented in Table 10. When grown without supplemental phosphate, co-inoculated alfalfa produced 19% more hay than alfalfa inoculated with *R. meliloti* strain NRG-185. This yield increase is equivalent to 667 lbs/ac more than the amount of hay produced by alfalfa inoculated only with *R. meliloti*.

When 10 kg/ha of supplemental phosphate fertilizer was applied, co-inoculated alfalfa produced 7.6% more hay than alfalfa inoculated only with *R. meliloti* NRG-185. This yield increase is equivalent to 312 lbs/ac more than the amount of hay produced by alfalfa inoculated only with *R. meliloti*.

TABLE 10

Effect of inoculation with *Penicillium bilaii* or *Rhizobium meliloti* strain NRG-185, singly or in combination at two phosphate levels, on hay production. Data collected during the second growing season.

| Treatment | Hay production kg ha$^{-1}$ | | |
|---|---|---|---|
| | First cut | Second cut | Total |
| Unfertilized | | | |
| Control | 1912 | 1952 | 3864 |
| *R. meliloti* NRG-185 | 1912 | 1984 | 3896 |
| *P. bilaii* | 1624 | 1788 | 3412 |
| Co-inoculation | 2283 | 2361 | 4644 |
| 10 mg P/kg$^{-1}$ soil | | | |
| Control | 2312 | 2166 | 4478 |
| *R. meliloti* NRG-185 | 2160 | 2437 | 4597 |
| *P. bilaii* | 1863 | 2105 | 3968 |
| Co-inoculation | 2401 | 2546 | 4947 |
| SED | | | |
| Phosphate fertilizer | 189 | 166 | |
| Inoculant | 219 | 136 | |

EXAMPLE 6

Microbially pure peat-based inoculants containing *P. bilaii* (Strain ATCC 20851) and *R. meliloti* strain NRG-34 were prepared as follows. Powdered peat (6% moisture content) packaged in heat-sealed plastic bags (28 g/bag) was sterilized by gamma irradiation at a dosage rate of 5.5 mega-rads. *R. meliloti* strain NRG-34 was grown for 48 h at 30° C. in a 4-L fermenter containing yeast-extract-mannitol broth. *P. bilaii* was grown for 72 h at 30° C. in a 100-ml erlenmeyer flask containing potato-dexrose broth. Mixtures of the 2 cultures were then prepared so that different ratios of the 2 organisms, ranging from 14:0 to 7:7 (Rhizobium:*P. bilaii*), could be asceptically injected into the pre-sterilized bags of peat. The total volume of inoculum injected into each bag was 14 ml. The inocula were well-mixed into the peat carriers by carefully massaging each bag after which, the bags were cured, i.e., the titres of the inoculated cultures were increased, by holding the bags at room temperature for 24 h after inoculation and followed by further incubation at 30° C. for 96 h. The cured bags were then stored at 4° C. The number of colony-forming-units of *R. meliloti* and *P. bilaii* per gram of inoculant were determining by plate counts after 10, 165 and 260 days of storage. The ability of the rhizobial strain to form nodules was confirmed with a nodulation assay using alfalfa seeds to determine the "most-probable-number" (MPN) of rhizobia per gram of inoculant based on the number of nodules formed on alfalfa roots.

The results in Table 11 clearly indicate that *P. bilaii* and *R. meliloti* strain NRG-34 were compatible in a peat composition for a period of at least 8 months with no negative effects on each other. Plate counts (i.e., viable cfu) for each organism were unchanged after 165 and 260 days of storage. The MPN assay confirmed the nodulation performance of the rhizobial strain after 165 days of storage (the MPN assay was not performed at 260 days).

TABLE 11

Numbers (cfu/g) of *R. meliloti* NRG-34 and *P. bilaii* in "tandem" inoculant compositions prepared with different starting ratios of the two organisms.

| Ratio of | Plate count | | MPN |
|---|---|---|---|
| NRG-34 to *P. bilaii* | NRG-34 ($\times 10^9$) | *P. bilaii* ($\times 10^7$) | NRG-34 ($\times 10^9$) |
| 10 days of storage | | | |
| 14:0 | 6.8 | 0 | 3.0 |
| 11:3 | 5.8 | 0.8 | 3.0 |
| 10.4 | 5.2 | 2.0 | 2.5 |
| 9:5 | 5.9 | 0.8 | 0.6 |
| 8:6 | 3.9 | 2.3 | 2.5 |
| 7:7 | 7.7 | 1.3 | 3.5 |
| 165 days of storage | | | |
| 14:0 | 9.6 | 0 | 1.1 |
| 11:3 | 9.4 | 0.6 | 4.4 |
| 10.4 | 9.2 | 1.0 | 5.9 |
| 9:5 | 7.4 | 1.0 | 16.0 |
| 8:6 | 8.9 | 3.1 | 16.0 |
| 7:7 | 8.6 | 2.7 | 20.0 |
| 260 days of storage | | | |
| 14:0 | 6.5 | 0 | nd* |
| 11:3 | 4.6 | 0.5 | nd |
| 10.4 | 7.4 | 0.6 | nd |
| 9:5 | 5.9 | 0.8 | nd |
| 8:6 | 7.3 | 1.6 | nd |
| 7:7 | 6.1 | 1.1 | nd |

*Not determined.

EXAMPLE 7

A microbially pure peat-based "tandem" composition containing *P. bilaii* (Strain ATCC 20851) and *Bradyrhizobium japonicum* was prepared as disclosed in Example 6 with the following changes. Fifty three grams of powdered peat were dispensed into the plastic bags prior to sterilization by gamma irradiation. The total volume of *P. bilaii* plus *B. japonicum* added to each bag was 27 ml. *P. bilaii* was added at a rate of $3.3 \times 10^5$ cfu/g (i.e., Log 5.52 cfu/g) while *B. japonicum* was added at a rate of $1.8 \times 10^7$ cfu/g (i.e., Log 7.25 cfu/g). After the cultures were well-mixed with the peat carrier by massaging the bags, the bags were cured at 30° C. for 21 days. The viability of each organism inoculated into the bags was determined with the plate count assay 7, 14, and 21 days after inoculation. The target titre after curing for *P. bilaii* was $1 \times 10^7$ cfu/g (i.e., Log 7.00) and for *B. japonicum* was $5 \times 10^8$ cfu/g (i.e., Log 8.69 cfu/g). The data in Table 12 demonstrates that the titre of both organisms at the end of the curing period exceeded the targets.

TABLE 12

Numbers (cfu/g) of *B. japonicum* and *P. bilaii* in a "tandem" inoculant composition prepared for soybeans.

| Curing time | *B. japonicum* (cfu/g)* | *P. bilaii* (cfu/g)* |
|---|---|---|
| 7 days | 7.64 | 5.11 |
| 14 days | 8.71 | 7.59 |
| 21 days | 9.29 | 8.12 |

*Data expressed as "logs of means"

The soybean "tandem" composition was assessed for the nodulation and root colonization performance by *B. japonicum* and *P. bilaii* respectively. At the end of the curing period, dampened soybean seeds were inoculated with the composition and then planted in 50-ml tubes containing pre-moistened growing mix (1 seed/tube). The tubes were placed on a growth table and the plants harvested 3 weeks after emergence. Intact root systems were removed from each tube, excess potting mix gently shaken off, and checked for the presence of nodules. Root colonization by *P. bilaii* was determined as disclosed in Example 2. The data in Table 13 indicate that all test soybean plants were nodulated and that 91% of the roots were colonized by *P. bilaii*.

TABLE 13

Effects of the "tandem" composition on root colonization by *P. bilaii* and nodulation by *B. japonicum*.

| % of roots with nodules | % root colonization by *P. bilaii* |
|---|---|
| 100 | 91.3 |

EXAMPLE 8

A microbially pure peat-based "tandem" composition containing *P. bilaii* (Strain ATCC 20851) and *R. leguminosarum* bv. viaeae was prepared as disclosed in Example 8 with the following changes. Fifty three grams of powdered peat were dispensed into the plastic bags prior to sterilization by gamma irradiation. The total volume of *P. bilaii* plus *R. leguminosarum* bv. viceae added to each bag was 27 ml. *P. bilaii* was added at a rate of $3.3 \times 10^5$ cfu/g (i.e., Log 5.52 cfu/g) while *R. leguminosarum* was added at a rate of $1.8 \times 10^7$ cfu/g (i.e., Log 7.25 cfu/g). After the cultures were well-mixed with the peat carrier by massaging the bags, the bags were cured at 30° C. for 21 days and then stored at room temperature i.e., 22° C. The viability of each organism inoculated into the bags was determined with the plate count assay after the curing period was completed and then after 1 month and 3 months of storage. The target titre after curing for *P. bilaii* was $1 \times 10^7$ cfu/g (i.e., Log 7.00) and for *R. leguminosarum* bv. viceae was $5 \times 10^8$ cfu/g (i.e., Log 8.69 cfu/g).

The data in Table 14 demonstrates that the titre of both organisms at the end of the curing period exceeded the targets, and were maintained during the 3-month storage period.

TABLE 14

Numbers (cfu/g) of *R. leguminosarum* bv. *viceae* and *P. bilaii* in a "tandem" inoculant composition prepared for pea.

| Storage time | *R. leguminosarum* (cfu/g)* | *P. bilaii* (cfu/g)* |
|---|---|---|
| After cure completed | 9.46 | 7.48 |
| 1 month | 9.31 | 8.01 |
| 3 months | 8.82 | 7.80 |

*Data expressed as "logs of means"

The pea "tandem" composition was assessed for the nodulation and root colonization performance by *R. leguminosarum* bv. viceae and *P. bilaii* respectively. At the end of the 3-month storage period, dampened pea seeds were inoculated with the composition and then planted in 50-ml tubes containing pre-moistened growing mix (1 seed/tube). The tubes were placed on a growth table and the plants harvested 3 weeks after emergence. Intact root systems were removed from each tube, excess potting mix gently shaken off, and checked for the presence of nodules. Root colonization by *P. bilaii* was determined as disclosed in Example 2. The data presented in Table 15 indicate that all pea roots were nodulated and that 91% of the roots were colonized by *P. bilaii*.

TABLE 15

Effects of the "tandem" composition on root colonization by *P. bilaii* and nodulation by *R. leguminosarum*.

| % of roots with nodules | % root colonization by *P. bilaii* |
|---|---|
| 100 | 91.3 |

EXAMPLE 9

TANDEM Field Performance

Field trials with alfalfa were planted at three locations in Alberta in 1992 to compare the performance of alfalfa inoculated with the "tandem" inoculant composition containing *P. bilaii* (Strain ATCC 20851) and *R. meliloti* with co-inoculated alfalfa, i.e., alfalfa that was inoculated with the two microorganisms prepared as a slurry just prior to use. The sites were located in the County of Grande Prairie and were identified as follows (legal description in brackets):
Toews, West; (NW9-71-11-W6)
Toews, East; (NW10-71-11-W6)
Hegland; (SW18-72-10-W6)
Five seed inoculant treatments i.e., uninoculated control, *R. meliloti* strain NRG-34, *P. bilaii*, *P. bilaii* plus *R. meliloti* NRG-34 prepared as a slurry, and a "tandem" composition containing both microorganisms, were imposed over 3 phosphate fertilizer mainplot regimes i.e., 0, 10 and 20 kg ha$^{-1}$, applied as seed-placed triple-super-phosphate (0-45-0). The treatment rows were 20 feet long and were arranged in a complete-randomized-block design. Each treatment was replicated 6 times at each site. Hay production data was generated by harvesting each treatment row twice during the 1993 growing season (June and September), determining the dry weight of hay produced/row, and then extrapolating the data to estimate hay production/hectare. The hay production data for treatments in the year after the trials were planted, are presented in Table 16.

TABLE 16

Comparison of hay production by alfalfa culated with the
*P. bilaii* plus *R. meliloti* strain NRG-34
"Tandem" composition with alfalfa co-inoculated with the
microorganisms prepared as a slurry just prior to inoculation.
Data collected during the second growing season.

| Treatment | Hay production kg ha$^{-1}$ | | |
| --- | --- | --- | --- |
| | First cut | Second cut | Total |
| Unfertilized | | | |
| Control | 1744 | 2426 | 4170 |
| "Slurry" inoculum | 1995 | 2455 | 4450 |
| "Tandem" composition | 1990 | 2506 | 4496 |
| 10 mg P/kg$^{-1}$ soil | | | |
| Control | 1864 | 2371 | 4235 |
| "Slurry" inoculum | 2116 | 2446 | 4562 |
| "Tandem" composition | 2099 | 2414 | 4513 |
| 20 mg P/kg$^{-1}$ soil | | | |
| Control | 1988 | 2293 | 4281 |
| "Slurry" inoculum | 2358 | 2439 | 4797 |
| "Tandem" composition | 2255 | 2385 | 4640 |
| SED | | | |
| Phosphate fertilizer | 293 | 207 | |
| Inoculant | 189 | 208 | |

In the treatments that did not receive supplemental phosphate fertilizer, the total hay production by alfalfa inoculated with the "tandem" composition the previous year was 7.8% greater than in the uninoculated controls. In treatments receiving 10 kg/ha of supplemental phosphate fertilizer, alfalfa inoculated with the "tandem" composition produced 6.5% more hay than the uninoculated controls, while in treatments receiving 20 kg/ha of supplemental phosphate fertilizer, alfalfa inoculated with the "tandem" composition 8.3% more hay than the uninoculated controls. Inoculation of alfalfa with the "tandem" composition did not affect hay production when compared to alfalfa co-inoculated with a slurry prepared with both microorganisms just prior to inoculation.

Although the foregoing invention has been described in some detail by way of illustration and example for purposes of clarity of understanding, it will be apparent that various changes and modifications may be practised within the scope of the appended claims.

What we claim is:

1. A method of preparing a composition for co-inoculating legume seeds, comprising packaging a carrier substrate in a container, sterilizing the substrate, adding a suspension of spores of *P. bilaii*, adding a suspension of Rhizobium sp. cells, and mixing said suspensions with said carrier to form a composition.

2. A method according to claim 1 wherein said container is flexible and said suspensions are mixed with said carrier by massaging said container.

3. A method according to claim 1 wherein composition is cured at a temperature of 20° to 30° C. for a period of about 14 to 35 days prior to storage or use of said composition.

4. A method according to claim 1 wherein said carrier is powdered peat having a moisture content of about 6 to 20%.

* * * * *